United States Patent [19]

Yates et al.

[11] Patent Number: 4,970,859

[45] Date of Patent: Nov. 20, 1990

[54] EXHAUST GAS DEFLECTOR FOR TRUCK EXHAUST STACKS

[76] Inventors: Clyde I. Yates, 7765 S. Erie Ave., 74136; Robert W. Krah, 9433 S. 67th East Ave., both of Tulsa, Okla. 74133

[21] Appl. No.: 481,890

[22] Filed: Feb. 20, 1990

Related U.S. Application Data

[63] Continuation-in-part of Ser. No. 350,145, May 8, 1989, Pat. No. 4,903,484.

[51] Int. Cl.[5] .......................... F02B 35/00; F01N 7/00
[52] U.S. Cl. .......................................... 60/324; 60/324
[58] Field of Search ........................... 60/316, 319, 324

[56] References Cited

U.S. PATENT DOCUMENTS

| | | | |
|---|---|---|---|
| 2,984,967 | 5/1961 | Caddell | 60/316 |
| 3,788,072 | 1/1974 | Burger | 60/324 |
| 3,940,097 | 2/1976 | Wilson | 60/316 |
| 4,665,691 | 5/1987 | Eller | 60/316 |

FOREIGN PATENT DOCUMENTS

349955  7/1937  Italy ...................... 60/316

*Primary Examiner*—Douglas Hart

*Attorney, Agent, or Firm*—Head and Johnson

[57] ABSTRACT

An improved exhaust gas deflector for the top of a vertical tubular truck exhaust stack, the deflector being formed of a generally horizontal base plate having an opening therethrough, a vertical tubular member secured to the base plate coincident with the opening therein, the lower end of the tubular member being attached to the top of the truck exhaust stack, a pair of spaced apart side panels affixed to the base plate, an air scoop plate affixed adjacent the front edge of the base plate and the side edges thereof affixed to the side panels, a portion of the air scoop plate extending over and above a portion of the tubular member, the air scoop plate being inclined downwardly, and an upwardly inclined deflector plate affixed to the base plate rear edge and the side edges thereof being affixed to the side panels, so that as the truck having the exhaust gas deflector thereon moves, air passes through the deflector and is commingled with the exhaust gas which is deflected in an upward direction. In a preferred embodiment, a rain cover is pivotally attached to the air scoop plate, the cover normally extending over the tubular member and pivoting upwardly in response to exhaust gases passing through the tubular member.

10 Claims, 5 Drawing Sheets

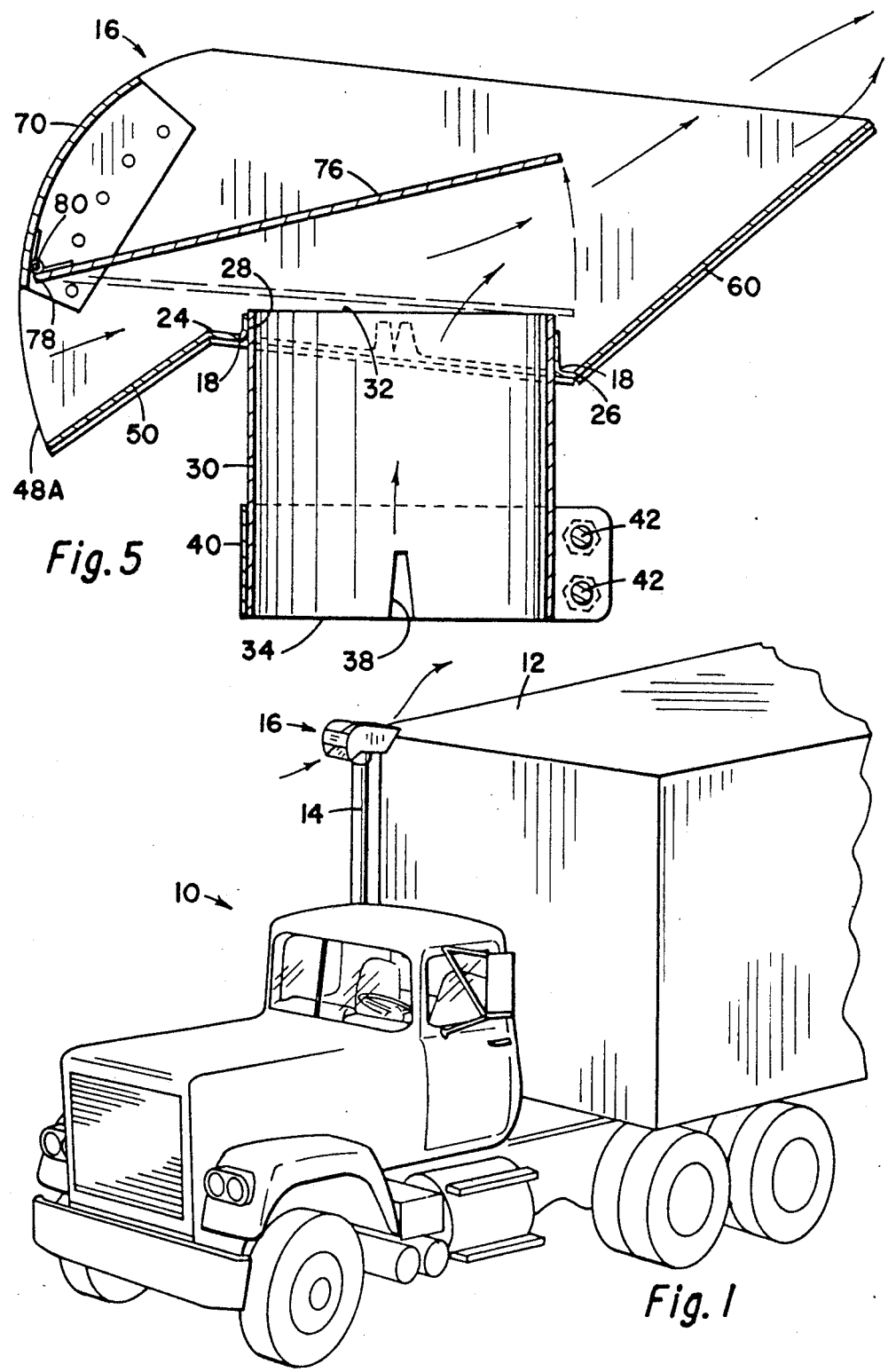

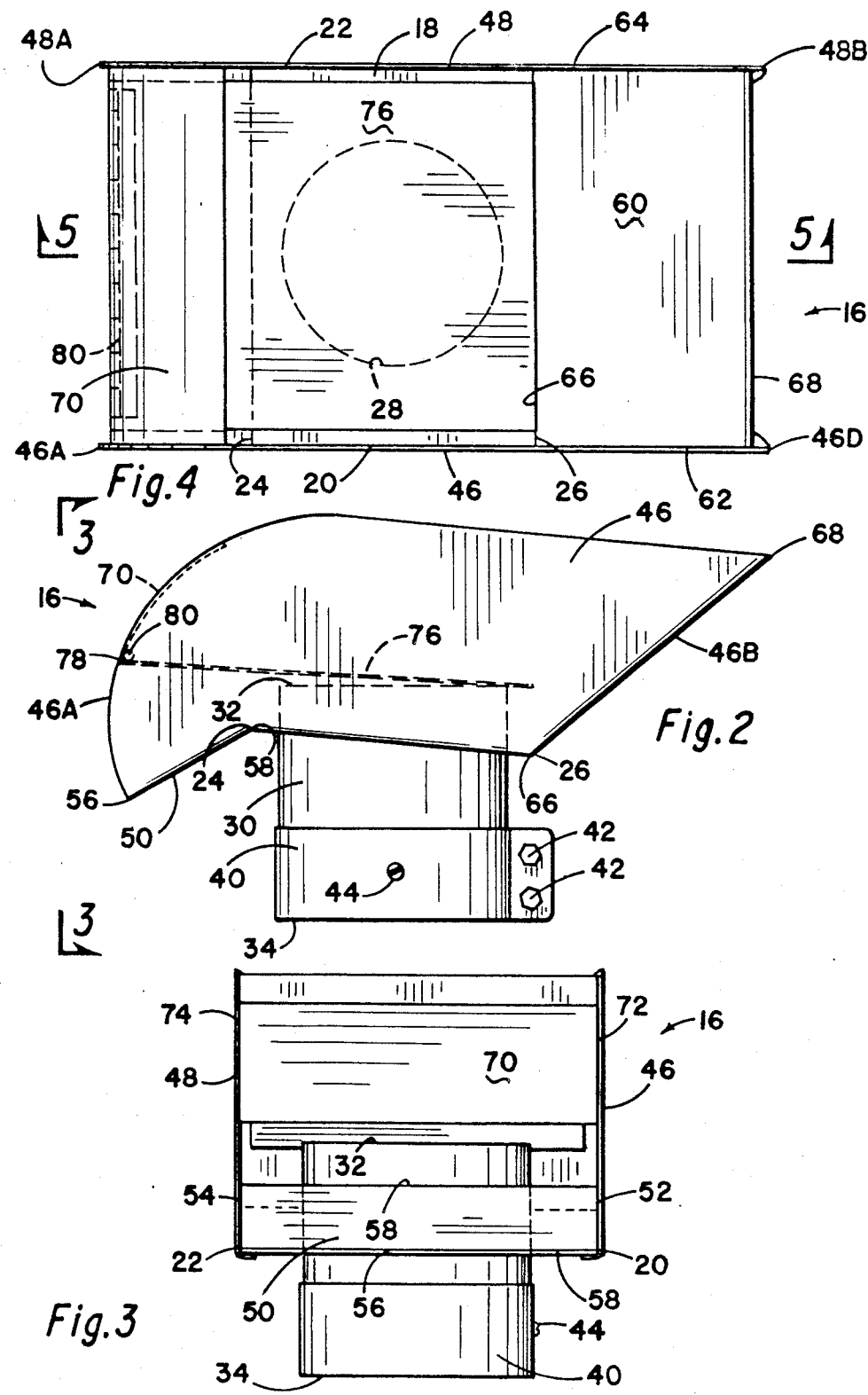

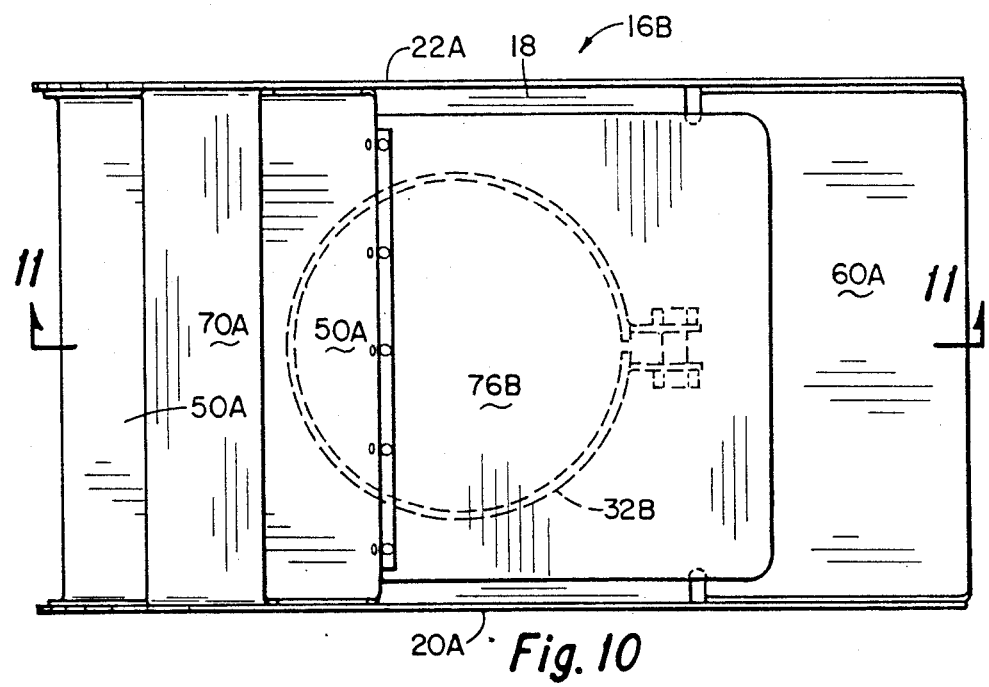
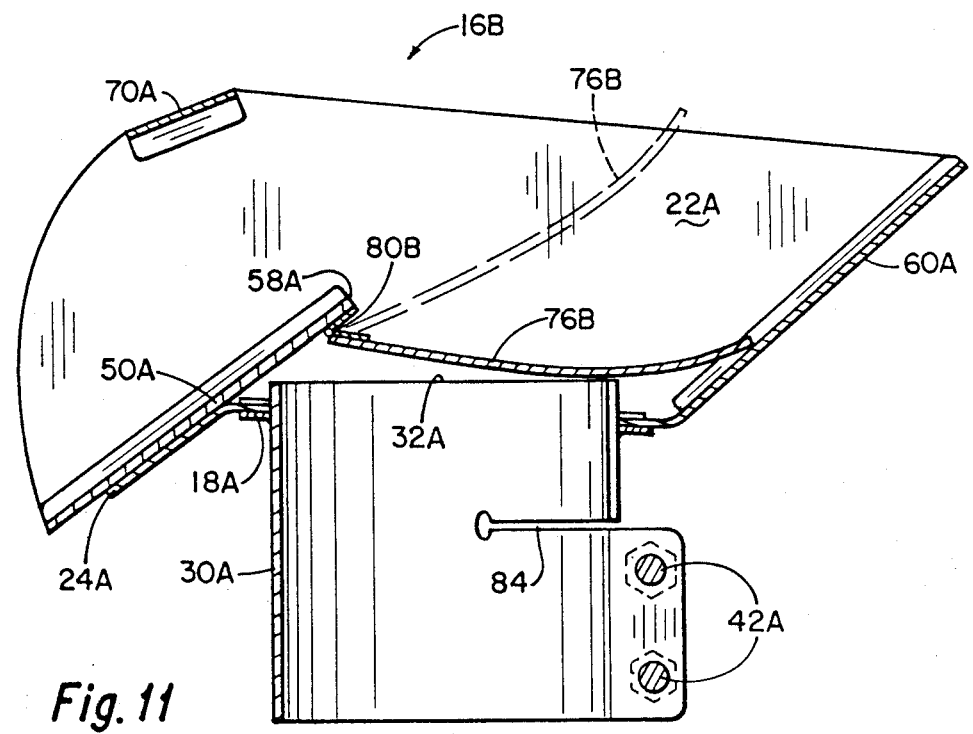

EXHAUST GAS DEFLECTOR FOR TRUCK EXHAUST STACKS

This is a continuation-in-part of Application Ser. No. 350,145, entitled "Exhaust Dissipator And Deflector" filed May 8, 1989 now U.S. Pat. No. 4,903,484 granted Feb. 27, 1990.

SUMMARY OF THE INVENTION

Most large trucks in use in the United States and in other parts of the world today use diesel oil as the primary fuel. While diesel oil is a very satisfactory fuel, it produces smoke as a result of combustion in the engine. The exhaust gases of the truck engine are typically directed upwardly by a vertical exhaust stack extending from the truck. Since the maximum height of trucks is limited by bridges and overpasses through which the truck must travel on highways, the type of exhaust stack typically is substantially equal with or very little higher than the top of the truck or the trailer portion pulled by the truck. With an open top vertical exhaust stack, the exhaust gases are moved generally horizontally as the truck moves through the air at typical driving speeds. Gases from the exhaust stack frequently impinge upon the trailer portion of the truck, causing the trailer portion to become blacken and unsightly.

The present disclosure is directed toward a device for attachment to the top of a truck exhaust stack. The device accomplishes three basic objectives. First, the device functions to deflect the exhaust gas upwardly to thereby reduce impingement of the exhaust gases on the truck trailer portion. Second, the device creates a slight pressure reduction in the top end of the truck exhaust stack, thereby reducing the exhaust back pressure on the truck engine. Third, in the preferred embodiment, the device provides a rain shield to prevent rain or snow from entering the truck exhaust stack.

The exhaust gas deflector of this disclosure is formed of a generally horizontal base plate having opposed side edges, a front edge and an opposed rear edge. The base plate has an opening through it spaced between the side edges and the front and rear edges.

A vertical tubular pipe portion has an upper and a lower end and is secured to the base plate coincident with the opening in the base plate. The lower end of the vertical tubular pipe portion has means for attachment to the top of a truck vertical exhaust stack. This typically is achieved by providing slits in the lower end of the vertical tubular pipe portion so that the internal diameter thereof may be varied. Around the exterior of the pipe portion a circumferential band is provided having ends which are spaced apart. When the vertical tubular portion is positioned on a truck exhaust stack, a bolt extending between the ends of the band is tightened, thereby reducing the interior circumferential diameter of the tubular pipe portion to secure it to the upper end of the truck exhaust stack. Instead of clamping to an exhaust stack, the deflector can be welded directly to the upper end of the stack extending from an engine or engine muffler.

The exhaust gas deflector further is formed by a pair of spaced apart side panels, one being affixed to each of the base plate side edges, the side panels extending vertically and each having a forward and a rearward end.

An air scoop plate has opposed side edges, a front edge and an opposed rear edge. The air scoop rear edge is affixed to the base plate front edge and the side edges are affixed to the side panels. The air scoop plate is inclined downwardly from the rear edge to the front edge.

A deflector plate has opposed side edges, a front edge and a rear edge and has the front edge affixed to the base plate rear edge. The side edges are affixed to the side panels. The deflector plate is inclined upwardly from the front edge to the rear edge. A spacer member having opposed ends is affixed to the side panels. The spacer member is placed above the air scoop plate and in the preferred arrangement, the spacer member is curved to conform to the curved forward end of the side plates.

The exhaust gas deflector serves to direct air upwardly by the combined effect of the sloped air scoop and deflector plates, the air moving between the side panels. This upwardly deflected air carries with it exhaust gas passing from the truck exhaust stack through the tubular portion so that the exhaust gas and air mixed therewith are deflected upwardly to thereby reduce impingement of the exhaust gas on the truck trailer portion.

In a further preferred arrangement, a rain cover is employed in conjunction with the truck exhaust gas deflector. The cover is in the form of a plate which is pivotally supported to the deflector between the side plates. In the non-actuated position the plate extends over the top of the tubular pipe portion to thereby prevent rain or snow from entering the tubular pipe portion and thereby entering into the truck exhaust stack. In the actuated position the cover plate is pivoted upwardly by the exhaust passing from the tubular pipe portion. The cover plate is preferably pivoted to the spacer member which extends between the side plates.

As previously indicated, the exhaust gas deflector serves the three functions of (1) upwardly directing exhaust gas to reduce impingement on the trailer portion of a truck as the truck moves at highway speeds, (2) serves to apply a small vacuum effect to the exhaust stack to reduce the exhaust back pressure, and (3) serves to prevent rain, snow and other contaminants entering into the truck exhaust stack.

In an alternate embodiment, the air scoop plate extends partially up and over the vertical tubular pipe portion. This arrangement increases the venturi effect to pull exhaust gases upwardly through the tubular pipe portion and directs the gases upwardly. In the embodiment wherein the air scoop plate extends partially over the top of the tubular pipe portion, the rain guard, when pivoted in the downward or non-actuated position, may be configured to engage the rearward edge of the air scoop plate. Together with the air scoop plate, the rain guard fully covers the top of the tubular pipe portion to prevent direct access of rain or snow into the top of the truck exhaust.

In the embodiment wherein the air scoop plate extends partially over the tubular pipe portion, the rain cover, rather than being pivoted to some other part of the exhaust gas deflector may be pivoted directly to the air scoop plate. Specifically, the forward edge of the rain guard is pivoted to the air scoop plate at the upper or rearward edge thereof in that portion which extends above the tubular pipe portion. This arrangement is highly advantageous in that the combination of the air scoop plate and the rain guard form a bearer which prevents exhaust smoke from passing downwardly through the forward part of the body of the deflector when the truck on which the device is used is at rest and in idling condition.

The invention will be better understood with reference to the following description and claims, taken in conjunction with the attached drawings.

DESCRIPTION OF THE DRAWINGS

FIG. 1 is an isometric view of a typical truck and trailer combination, the truck having a vertical exhaust stack, and having the exhaust gas deflector affixed to the upper end thereof.

FIG. 2 is an elevational side view of the exhaust gas deflector of this disclosure shown in a preferred embodiment.

FIG. 3 is a front view of the exhaust gas deflector taken along the line 3—3 of FIG. 2.

FIG. 4 is a top view of the exhaust gas deflector of this disclosure.

FIG. 5 is a cross-sectional view taken along the line of 5—5 of FIG. 4.

FIG. 10 is a top view of another alternate embodiment of the improved exhaust gas deflector.

FIG. 11 is a cross-sectional view taken along the line 11—11 of FIG. 10, showing the rain cover pivoted by a hinge attached to the rearward surface of the air scoop plate, and showing in dotted outline the rain cover in the actuated position.

DESCRIPTION OF THE PREFERRED EMBODIMENTS

Figure 6:
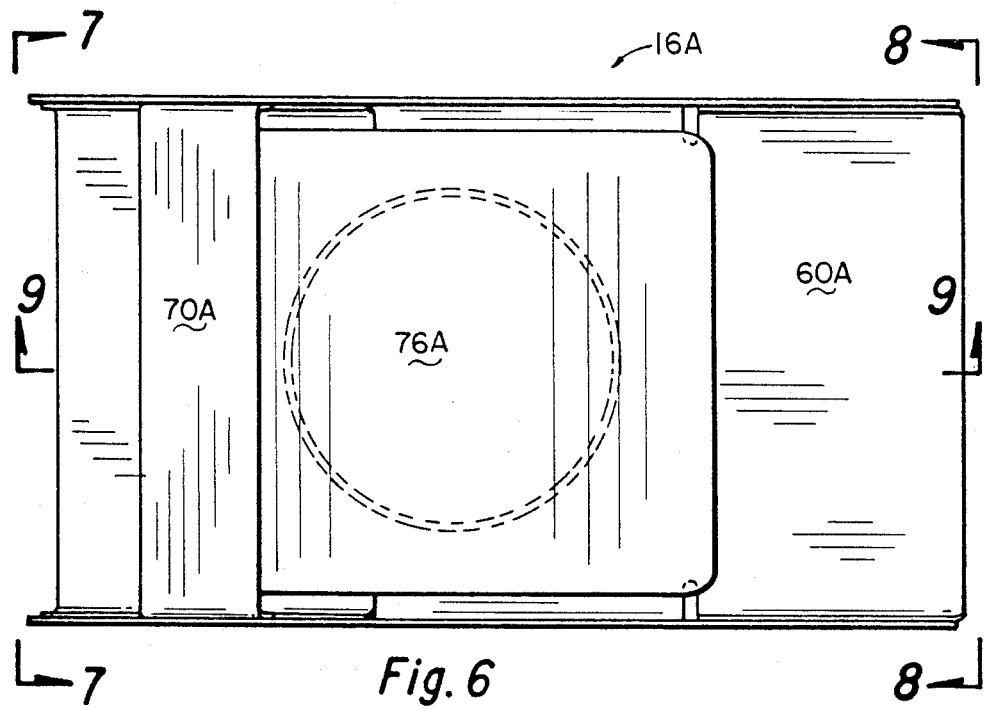
FIG. 6 is a top view of an improved embodiment of the exhaust gas deflector.

Referring to the drawings and first to FIG. 1, the environment in which the invention is used is illustrated. A truck is generally indicated by the numeral 10 having a trailer portion 12. The truck has a vertical exhaust stack 14 by which the products of combustion of the engine are exhausted to the atmosphere. Typically, the exhaust stack of the truck extends as high as possible into the air but because of height limitations, the top of the exhaust stack 14 cannot usually be significantly higher than the top of the truck trailer portion 12. For this reason, exhaust gases, which include all of the products of combustion of fuel, which is typically diesel fuel, frequently impinge upon the truck trailer portion 12 and cause it to become blacken or otherwise soiled and displeasing in appearance. To improve the discharge of gases from the exhaust stack 14, this disclosure provides a truck exhaust gas deflector, generally indicated by the numeral 16, which will now be more fully and completely described with reference to FIGS. 2-5.

The preferred embodiment of the exhaust gas deflector is formed of a generally horizontal base plate 18. The base plate is described as "generally horizontal", although in the preferred embodiment, as illustrated, the plate sightly departs from the horizontal. The base plate has opposed side edges 20 and 22, a front edge 24 and a rear edge 26. Further, the base plate has a cylindrical opening 28 therein which is spaced from the front and rear edges 24 and 26, and the side edges 20 and 22.

The second basic portion of the exhaust gas deflector 16 is a vertical tubular pipe portion 30 having an upper end 32 and a lower end 34. The base plate circumferential opening 28 is received on the exterior of the vertical tubular pipe portion 30 and secured to it. This may be accomplished by providing integral flange portions formed as a part of the base plate surrounding the circumferential opening 28, as shown in FIG. 5.

A means is provided for affixing the vertical tubular piping portion 30 to the upper end of the truck exhaust stack 14. This is accomplished, in one manner, by providing slits 38 in the tubular pipe portion adjacent the lower end 34. These slits 38 allow the internal circumferential diameter of the pipe portion to be varied. Surrounding the pipe portion adjacent the lower end 34 is a band 40. The ends of the band 40 are spaced apart, and the ends can be drawn towards each other by means of bolts 42 in the usual way of that of a hose clamp. By tightening the bolts 42, the lower end of the tubular pipe portion 30 can be reduced so as to clamp it to the upper end of the truck exhaust stack 14.

A threaded hole is provided in the band 40 and through the tubular pipe portion 30. The threaded hole receives a screw 44 to lock the tubular pipe portion 30 in place onto the top on the exhaust stack 14 and prevents the rotation of the exhaust gas deflector.

Affixed to the base plate side edge 20 is a first vertical side panel 46, and in like manner, affixed to edge 22 is a second vertical side panel 48. The side panels 46 and 48 thus are parallel to and spaced apart from each other. Side panel 46 has a forward end 46A and a rearward end 46B and in like manner, side panel 48 has a forward end 48A and a rearward end 48B. In the preferred arrangement, the forward end of each of the side panels is arcuate, as best seen in FIGS. 2 and 5, and the rearward ends are inclined upwardly.

An air scoop plate 50 has opposed side edges 52 and 54, a front edge 56 and a rear edge 58. The air scoop plate side edges 52 and 54 are affixed to the vertical side panels 46 and 48 respectively. The side plate rear edge 58 joins the base plate front edge 24. The air scoop plate 50 is inclined downwardly from the rear to the front edge to impart an upward direction to air passing thereover.

A deflector plate 60 has opposed side edges 62 and 64 which are affixed to the side panels 46 and 48 respectively at the side panels rear edges 46B and 48B. The deflector plate 60 also has a front edge 66 and a rear edge 68. The front edge 66 is affixed to the base plate rear edge 26. The deflector plate 60 is inclined upwardly from the front edge 66 to the rearward 68 and serves to deflect exhaust gases upwardly as the exhaust gas deflector moves through the air.

A spacer member 70 has a first end 72 affixed to the first vertical side plate 46 and a second end 74 affixed to the second vertical side plate 48. In the preferred arrangement, the spacer member 70 is arcuately configured in planes perpendicular to the length thereof to coincide with the arcuate shape of the side plate forward edges 46A and 48A. The spacer member 70 is positioned above the deflector air scoop 50 to provide a space therebetween which functions as an inlet opening into the generally horizontal body portion formed by the side panels 46 and 48.

A rain cover plate 76 is received between the vertical side panels 46 and 48. The rain cover, which can be in the form of a flat plate as illustrated, has a forward edge 78. A hinge 80 is affixed to the rain cover 76 adjacent the forward edge 78 and to the spacer member 70. In its non-deflected position, as illustrated in FIG. 2 and in dotted outline in FIG. 5, the rain cover 76 extends over the upper open end 32 of the vertical tubular pipe portion 30 to thereby prevent rain or snow from entering into the interior of the tubular portion 30 and into the interior of the truck exhaust stack 14.

With the exhaust gas deflector in place on the top of a truck exhaust stack 14 and the truck moving at typically highway speeds, air passes through the deflector by passing between the air scoop plate 50 and the spacer member 70. The air passes upwardly, lifting the rain cover 76. The air mixes with the exhaust passing out of the exhaust stack 14 and through the vertical tubular pipe portion 30. The mixed air and exhaust then pass out from between the side panels 46 and 48 and is further deflected upwardly by deflector plate 60. Thus, both the air scoop plate 50 and the deflector plate 60 serve to impart an upward direction to air passing through the deflector. This action directs the mixed air and exhaust gas in an upward direction so that less of the exhaust gas tends to impinge upon the truck trailer portion 12.

Further, it is believed, and limited experiments have indicated, that this upward flow of air tends to create a slight reduction in pressure at the top of stack 14 to thereby slightly reduce the exhaust gas back pressure on the truck engine, although actual measurements of the exhaust pressure at the top of the truck exhaust stack have not been made.

The aerodynamic effect of spacer member 70 further helps reduce the air pressure within the deflector between the side panels 46 and 48 by directing air upwardly above the upper ends of the side panels. Further, the aerodynamic effect of the spacer member 70 provides lifting action for the rain cover 76 to ensure that the rain cover does not restrict escape of exhaust gases from the tubular pipe portion 30.

Figure 7:
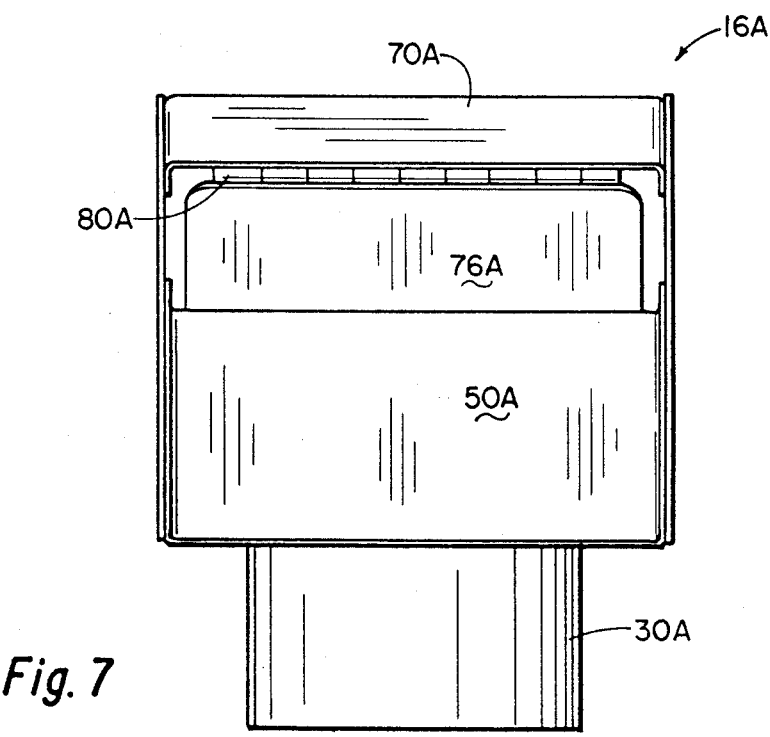
FIG. 7 is a front view of the improved exhaust gas deflector taken along the line of 7—7 of FIG. 6.
Figure 8:
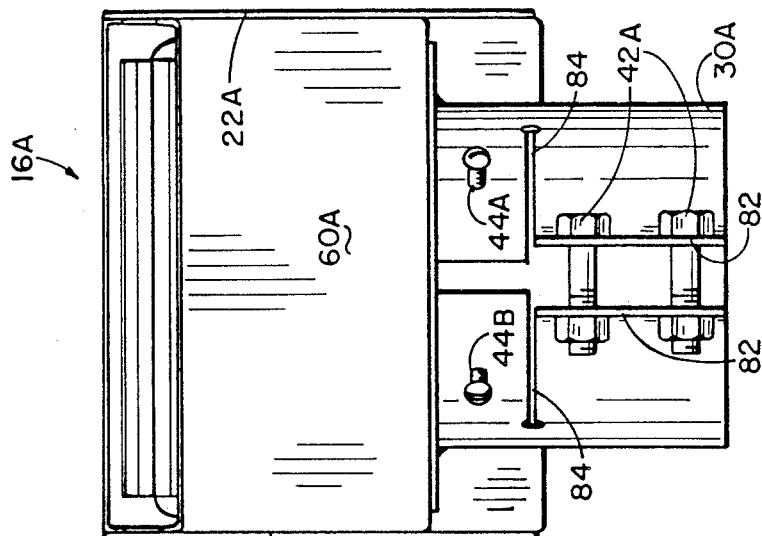
FIG. 8 is a rear view of the improved exhaust gas deflector taken along the line 8—8 of FIG. 6.
Figure 9:
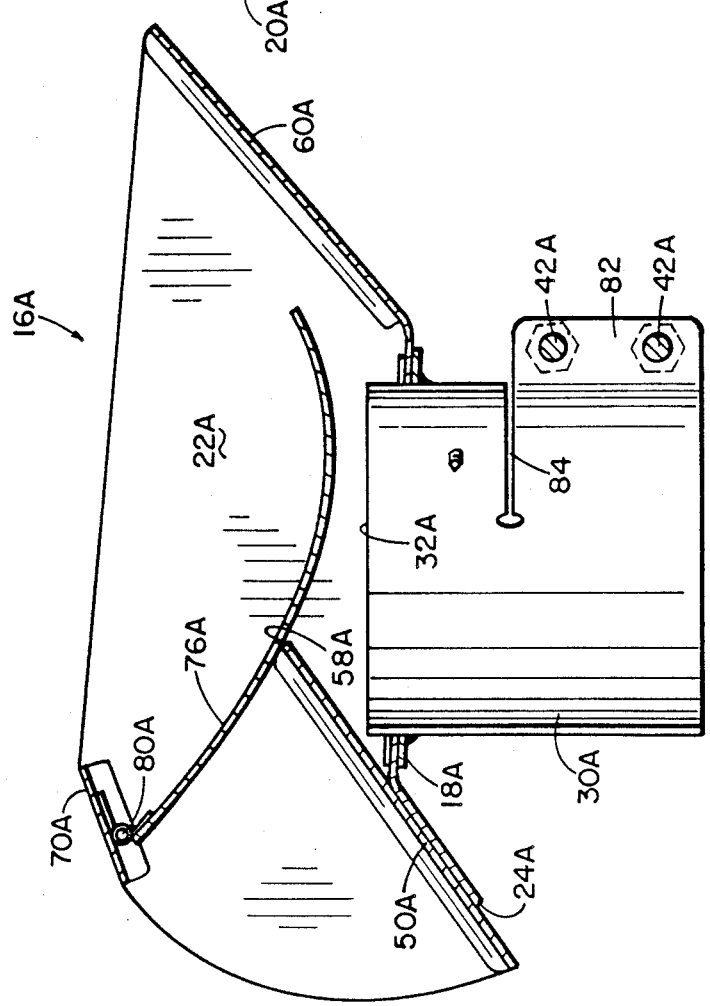
FIG. 9 is a cross-sectional view taken along the line 9—9 of FIG. 6, showing the arcuate, concave rain cover pivoted in the downward position and showing it engaged to the spacer member.

FIGS. 6, 7, 8 and 9 show a first alternate embodiment of the invention. The basic difference between this embodiment and that which has heretofore been discussed is best seen in FIG. 9. The air scoop plate 50A is extended so that the rear edge 58A extends partially over and above the vertical tubular pipe portion upper end 32A. By extending the air scoop plate 50A over the top of the vertical tubular pipe portion increased venturi is obtained to draw the exhaust gases from the tubular portion and thereby from the truck exhaust stack and to deflect the exhaust gases in an upwardly and rearward direction.

Another difference in the embodiment of FIGS. 6–9 is the configuration of the rain cover 76A. In this configuration the rain cover is of arcuate, concave configuration-that is, concaved as viewed from above or convexed as viewed from below. In the non-actuated position, that is, where no exhaust gases are passing upwardly through the tubular portion 30A the rain cover 76A rests against the air scoop upper edge 58A. The rain scoop and the upper rearward portion of the air scoop plate 50A cover the upper open end of the tubular pipe portion and thereby the upper open end of the truck exhaust, to prevent rain or snow from entering into the truck exhaust.

The arcuate, concaved configuration of the rain cover 76A has aerodynamic characteristics which improve the over-all performance of the exhaust gas deflector.

Another difference in the embodiment of FIGS. 6–9 is in the tubular pipe portion 30A. Whereas in the embodiment of FIGS. 1–5, a band 40 is employed to retain the exhaust gas deflector in position at the top of an exhaust stack, in this alternate embodiment, the vertical tubular pipe portion 30A is split at the lower end portion thereof and has integral flange portions 82. To allow the flange portions to move freely toward each other to effectively clamp around the top of an exhaust stack, a horizontal slit 84 is formed in the vertical tubular pipe portion 30A. The horizontal slit 84 extends approximately one-half of the circumference of the tubular pipe portion 30A. Bolts 42A, with associated nuts, serve to clamp the tubular pipe portion on the upper end of a truck exhaust stack. Screws 44A extend through threaded openings in the upper portion of the tubular pipe portion 30A to prevent the exhaust gas deflector from rotating on the exhaust stack-that is, to lock the exhaust gas deflector in proper orientation on the top of an exhaust stack. While the deflector is illustrated in the form of an attachable (and detachable) fixture, the deflector can instead be permanently affixed to the upper end of an exhaust stack extending from an engine or engine muffler, such as by welding.

FIGS. 10 and 11 show a slightly different embodiment of the exhaust gas deflector. The essential difference in FIGS. 10 and 11 is the point of pivotation of the rain cover 76B. Hinge 80B is attached to the rearward surface of the air scoop plate 50A adjacent the upper end 58A. The rain cover 76B is also preferably arcuate in configuration, with a concave appearance as viewed from above. The air scoop plate 50A together with the rain cover 76B extend over and protect the top 32A of the tubular pipe portion to prevent rain and snow from entering as has been previously described.

The placement of the hinge 80B which pivotally affixes the rain cover 76B to the upper inner surface of air scoop plate 50A has significant advantage over that shown in the embodiment of FIGS. 1–5 or the embodiment of FIGS. 7–9. As seen in the dotted line of FIG. 11, the rain cover 76B is deflected upwardly by exhaust escaping from the truck stack and through the tubular pipe portion 30A. The exhaust gases are deflected rearwardly by the combined upward extension of the air scoop plate 50A and the rain cover 76B. This prevents the possibility of exhaust gases from passing downwardly toward the front of the exhaust gas deflector during idling condition, that is, when the truck is not moving forward. It can be seen with the embodiments of FIGS. 1–9, that when the rain cover is upwardly deflected, a passageway exists beneath the rain cover so the possibility exists for exhaust gases to pass over the top of the air scoop plate and out through the front of the exhaust deflector. Of course, when the truck to which the air scoop deflector is attached is moving rapidly through the air there is no possibility of exhaust gases passing forwardly of the deflector in any of the embodiments of FIGS. 1–11, but the embodiment of FIGS. 10 and 11 provides advantages during idling condition.

The exhaust gas deflector described provides an improved means for deflecting exhaust gases upwardly to reduce the deposit of residue on truck trailer portions, to slightly reduce the back pressure on the truck exhaust and to shield the truck exhaust stack against the entrance of rain and snow.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purpose of exemplification, but is to be limited only by the scope of the attached claim or claims, including the full range of equivalency to which each element thereof is entitled.

We claim:

1. An improved exhaust gas deflector for the top of a vertical truck exhaust stack, comprising:
   a vertical tubular member having an upper and a lower end;
   means to attach said tubular member lower end to the top of a truck exhaust stack;
   a deflector body affixed to said tubular member at said upper end thereof, the deflector body having a forward and a rearward end and a passageway therethrough communicating with said tubular member;
   an upwardly inclined air scoop means at said forward end of said deflector body having a rearward edge, the rearward edge extending above and over said tubular member; and
   an upwardly inclined deflector means at the rearward end of said deflector body.

2. An improved exhaust gas deflector according to claim 1 wherein said deflector body has a top and a bottom, the bottom having an opening therein receiving said tubular portion adjacent said upper end thereof, and said top being open.

3. An improved exhaust gas deflector for the top of a vertical tubular truck exhaust according to claim 1 including:
   rain cover means pivotally supported adjacent to said air scoop means, the rain cover means when in the non-actuated position together with said air scoop means generally covering said vertical tubular member upper end and the rain cover means pivoting upwardly in response to exhaust passing through said pipe portion.

4. An improved exhaust gas deflector for the top of a vertical tubular truck exhaust according to claim 3 wherein said rain cover means is in the form of a plate which, in a vertical plane, is concave.

5. An improved exhaust gas deflector for the top of a vertical tubular truck exhaust stack, comprising:
   a generally horizontal base plate means having opposed side edges, a front edge and an opposed rear edge and having an opening therethrough spaced between the side edges and the front and rear edges;
   a vertical tubular pipe portion having an upper end and a lower end, the pipe portion being secured to said base plate coincident with said opening therein;
   means to attach said pipe portion lower end to the top of a truck vertical exhaust stack;
   a pair of spaced apart side panels, one being affixed to each of said base plate means side edges, each panel having a forward and a rearward end;
   an air scoop means having opposed side edges, front edge and an opposed rear edge, the side edges being affixed to said side panels, the air scoop means being inclined upwardly from said front edge to said rear edge with said rear edge extending above and over said tubular pipe portion; and
   a deflector means having opposed side edges, a front edge and an opposed rear edge, the side edges being affixed to said side panels, the deflector means being inclined upwardly from said front edge to said rear edge.

6. An improved exhaust gas deflector for the top of a vertical tubular truck exhaust stack according to claim 5 including:
   a spacer member having opposed ends affixed to said side panels and spaced from said air scoop means.

7. An improved exhaust gas deflector for the top of a vertical tubular truck exhaust according to claim 5 wherein each of said side panels has an upper and a lower edge, wherein said base panels, said air scoop means and said deflector means are affixed to said side panels, and wherein the upper edge of each of said side panels adjacent the forward end is curved downwardly to said air scoop means and wherein said spacer is affixed to said side panels adjacent said upper edges and forward ends thereof.

8. An improved exhaust gas deflector for the top of a vertical tubular truck exhaust according to claim 7 including a spacer member having opposed ends affixed to said side panels and spaced from said air scoop means and wherein said spacer is curved in planes perpendicular to the length thereof and wherein the curved shape is substantially coincident with said curved upper edge of each of said side panels.

9. An improved exhaust gas deflector for the top of a vertical tubular truck exhaust according to claim 5 including:
   rain cover means supported to said air scoop means and pivotal between an actuated and a non-actuated position, the rain cover means when in the non-actuated position together with said air scoop means generally covering said tubular pipe portion upper end and the rain cover means pivoting upwardly to the actuated position in response to exhaust gas passing through said pipe section.

10. An improved exhaust gas deflector for the top of a vertical tubular exhaust according to claim 9 wherein said rain cover means is in the form of a plate which, in a vertical plane, is concave.

* * * * *